(12) United States Patent
Tuxen et al.

(10) Patent No.: US 12,067,775 B2
(45) Date of Patent: *Aug. 20, 2024

(54) SYSTEM, DEVICE AND METHOD FOR MASTER CLOCK AND COMPOSITE IMAGE

(71) Applicant: TRACKMAN A/S, Vedbaek (DK)

(72) Inventors: Fredrik Tuxen, Rungsted Kyst (DK); Benjamin Michael Braithwaite, Vedbaek (DK)

(73) Assignee: TRACKMAN A/S, Hørsholm (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,510

(22) Filed: Jul. 17, 2023

(65) Prior Publication Data

US 2023/0360397 A1 Nov. 9, 2023

Related U.S. Application Data

(63) Continuation of application No. 16/949,546, filed on Nov. 3, 2020, now Pat. No. 11,748,985.

(60) Provisional application No. 62/930,351, filed on Nov. 4, 2019.

(51) Int. Cl.
*G06V 20/40* (2022.01)
*G06F 1/16* (2006.01)
*G06V 20/64* (2022.01)

(52) U.S. Cl.
CPC ............. *G06V 20/42* (2022.01); *G06F 1/163* (2013.01); *G06V 20/64* (2022.01)

(58) Field of Classification Search
CPC ........ G06V 20/52; G06V 40/10; G06V 20/20; G06V 20/40; G06V 20/41; G06V 20/44; G06V 20/49; G06V 2201/034; G06V 40/20; G06V 20/10; G06V 10/62; G06V 10/34; G06V 10/40; G06V 10/56; G06V 20/17; G06V 20/42; G06V 20/53
USPC .......................................................... 382/103
See application file for complete search history.

(56) References Cited

U.S. PATENT DOCUMENTS

| 6,292,130 | B1 * | 9/2001 | Cavallaro | G01S 13/87 |
| | | | | 342/55 |
| 2015/0319426 | A1 * | 11/2015 | Shukla | H04N 23/80 |
| | | | | 345/634 |
| 2016/0322078 | A1 * | 11/2016 | Bose | G01P 13/00 |
| 2019/0089923 | A1 | 3/2019 | Katano et al. | |

FOREIGN PATENT DOCUMENTS

CN 104270565 1/2015

* cited by examiner

*Primary Examiner* — Ajibola A Akinyemi
(74) *Attorney, Agent, or Firm* — Fay Kaplun & Marcin, LLP

(57) ABSTRACT

A system includes a sensor capturing sensor data and an imager capturing imager data in combination with a computing device configured to time calibrate the sensor and the imager, detect an occurrence of a first event in the sensor data and extract a first time at which the first event occurred, and identify a first image in the image data having a capture time correlating to the first time at which the first event occurred in combination with retrieving the first image for insertion into a composite image including further image data combined with at least a portion of the first image depicting the first event.

25 Claims, 8 Drawing Sheets
(8 of 8 Drawing Sheet(s) Filed in Color)

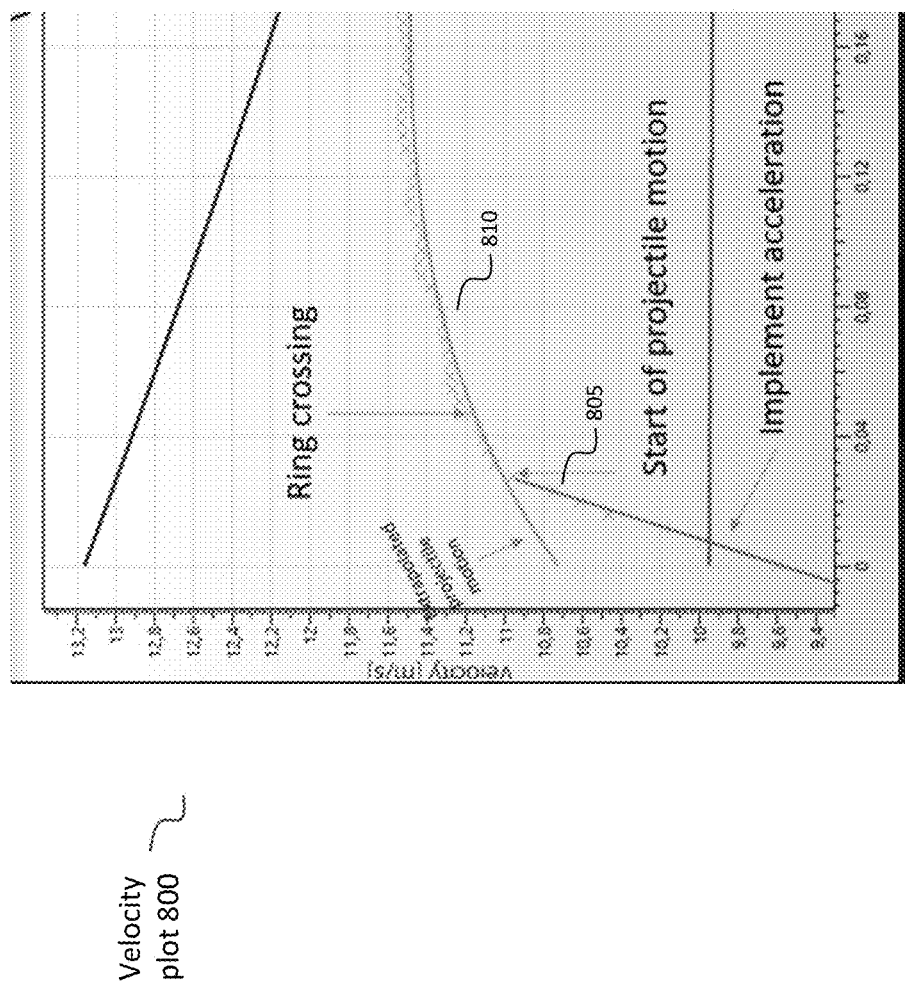

SYSTEM, DEVICE AND METHOD FOR MASTER CLOCK AND COMPOSITE IMAGE

PRIORITY CLAIM

The present application is a Continuation of U.S. patent application Ser. No. 16/949,546 filed on Nov. 3, 2020, now U.S. Pat. No. 11,748,985; which claims priority to U.S. Provisional Patent Application Ser. No. 62/930,351 filed on Nov. 4, 2019. The entire disclosure of these patent(s)/application(s) is expressly incorporated herewith by reference.

FIELD

The present disclosure relates to a system and a method for generating a composite image. In particular, the present invention relates to systems and methods for using sensor data and image data to track projectiles and/or persons during e.g. a baseball game or other sporting contest, and generate a composite image from the image data based in part on sensor detections of the precise times at which one or more events, e.g. a pitch or a hit, occurs.

BACKGROUND

Various systems have been devised to detect and illustrate events using image-based event detection systems. For example, in the context of sports, some systems have attempted to track a sports ball (e.g., a baseball) and illustrate the positions of other objects or players at key moments during play by detecting events through analysis of image data. One such moment may be, for example, the moment that a pitcher releases the pitch. Unfortunately, such systems are limited in several ways. First, the accuracy of the detection of such a moment is limited by the frame rate of the camera. That is, the timing of an event cannot be directly measured, through the analysis of images from the camera, with an accuracy better than the time associated with a particular frame closest to the event. A slightly improved accuracy may be achieved by interpolating motion between images, but even this manner of detection is limited by the blurring that occurs due to the travel of fast-moving objects during the exposure of each image. Thus, due to the rapid motion of e.g. the pitcher's hand and the ball, even if the capture of the image coincides precisely with the release of the pitch, this blurring may make a highly accurate determination of the time of release difficult or impossible. In addition, as a practical matter, such image-based systems employ a limited number of cameras and many such events will be obscured by intervening objects, bodies, etc. and will be impossible to accurately detect.

SUMMARY OF THE INVENTION

The present embodiments are directed to a system comprising a sensor capturing sensor data and an imager capturing imager data in combination with a computing device configured to time calibrate the sensor and the imager, detect an occurrence of a first event in the sensor data and extract a first time at which the first event occurred, and identify a first image in the image data having a capture time correlating to the first time at which the first event occurred in combination with retrieving the first image for insertion into a composite image including further image data combined with at least a portion of the first image depicting the first event.

The present embodiments are further directed to a method comprising time calibrating a sensor and an imager, the sensor capturing sensor data and the imager capturing imager data, detecting an occurrence of a first event in the sensor data and extracting a first time at which the first event occurred, determining a first image in the image data having a capture time correlating to the first time at which the first event occurred, and retrieving the first image for insertion into a composite image including further image data combined with at least a portion of the first image depicting the first event.

BRIEF DESCRIPTION OF THE FIGURES

This patent or application file contains at least one drawing/photograph executed in color. Copies of this patent or patent application publication with color drawing(s)/photograph(s) will be provided by the U.S. Patent and Trademark Office upon request and payment of the necessary fee.

FIG. 8 shows an exemplary velocity plot for a shotput scenario.

DESCRIPTION

Figure 1:
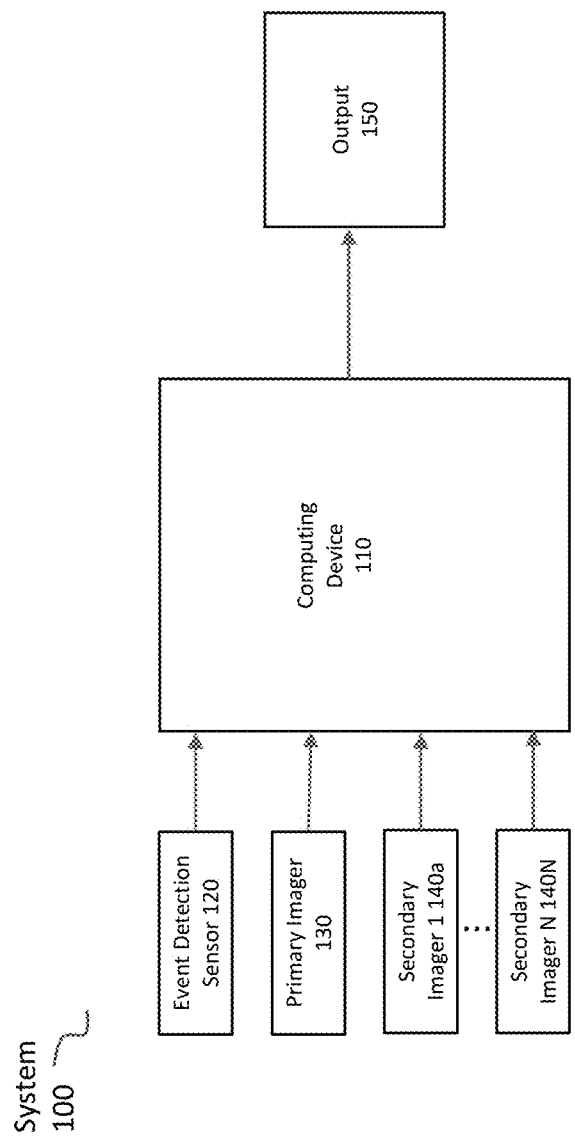
FIG. 1 shows a system for generating a composite image according to an illustrative embodiment.

Tracking devices are used to detect a variety of occurrences, specifically position- or velocity-related events for one of more moving objects in a sports contest, practice session, etc. For example, as understood by those skilled in the art, when a tracking system includes a radar, rapid changes in the radar signature may indicate the beginning of an object trajectory, an alteration in the trajectory, or the end of the trajectory. In an example, radar data may be used to determine the time at which an object reaches a particular location (e.g., when an object crosses a threshold), or the location of an object at a particular time. Radar-based event detection systems generally detect certain events with an accuracy superior to that of image-based event detection systems, and make such event detections with a data granularity finer than that achievable by a camera, which is limited by a particular frame rate.

For example, a primary sensor such as a radar-based event detection system may very precisely determine a time at which an event occurs, e.g., when a golf ball is struck by a club, a baseball is caught in a glove, a soccer ball crosses an out-of-bounds line, etc., with a time accuracy more precise than the frame rate of cameras such as those generally employed in current image-based detection systems. As would be understood by those skilled in the art, certain determinations as to the location of a moving object in three-dimensional space may be determined more accurately when data from a radar is analyzed in combination with data from one or more imagers.

If other sensors, such as imagers, are time-calibrated to the radar, e.g. keyed to the radar as the "master clock," a processing apparatus in communication with the radar and the sensors may pull from these other sensors data captured at the time at which the radar detected a selected event. Thus, images can be pulled from various imagers that capture the moment (or a moment close to that) at which the selected event occurred, even if the field of view of the imager does not include the location of the event or if the imager did not have a clear line of sight to the location of the event at the time of the event. This principle has various applications, for both real-time and historical processing of data. Those skilled in the art will understand that other types of sensors may be employed to detect the precise timing of events. For example, certain events may be detected employing other sensors such as microphones which detect the sounds of, for example, the impact of a ball against a golf club or baseball bat. In other embodiments, microelectomechanical systems (MEMS) sensors, e.g. accelerometers, gyroscopes, etc. may be used. A device such as a smart watch may include such sensors and may have a network connection to a processing apparatus as described herein and as would be understood by those skilled in the art. Such sensors may be employed separately or in combination with the radar to enhance the accuracy of the determination of the time at which such events occur.

In addition, embodiments herein are related to systems for automatically tracking which of a group of players performed specific actions tracked by the system. For example, if one or more of a group of players wears a smartwatch or similar device having a sensor capable of detecting movements of that player, and that sensor or any other sensor in the device is capable of detecting events as described in this application, the timing of such events may be detected and used in the same manner described below to generate composite images by selecting images whose timing corresponds to any detected events and combining parts of different images from different times as described below to generate the desired composite image.

In this case, however, the player participating in an event can be automatically identified by the system and the corresponding parts of any image may be labeled or otherwise tagged with this identification. For example, if several players on a soccer field are wearing such a device and each device is registered with the system so that data therefrom is uniquely assigned to the player wearing the device, sensor data from one device indicating that, at a particular time, the corresponding player kicked the ball, the kicker of the ball can be identified and the images (e.g., all frames of video from multiple cameras) associated with the time of this event may be labelled to indicate the player and action of the event. Thus, a library of images associated with a given action and/or a given player may be tagged to enable rapid searching of large amounts of imager data for relevant images.

In addition, composite images generated from such individual sensor detected events may be tagged in the same manner and may even be labeled to identify in the composite image the player performing a particular action. It is possible using such a system to generate composite images showing the same player in the same situations during different plays perhaps even in different games to illustrate differences in form, positioning, etc., associated with various events in which the player participates. One such embodiment, for example, may track baseball players taking batting practice with the smartwatch sensors identifying the player and detecting events such as swings of the bat. The system may then automatically retrieve relevant frames of video from multiple swings even over multiple days or weeks of practice to automatically generate a composite image (assuming a camera whose position relative to home plate is the same over time) that show changes in the player's batting stance, swing form, etc., over this time.

Similarly, such a system could allow an athlete such as a shot putter to analyze his form over multiple throws by automatically generating a composite image showing his position at the point of release of the shot over multiple throws even when other athletes are competing and/or training using the same location between the target athletes attempts. That is, due to the identifying data from the smartwatch, the system may choose releases of shots only performed by the target athlete. In fact, this system could also distinguish between different actions taken by the same athlete to generate, for example, a composite image of various shot putting attempts even where the same athlete had made several discuss throws from the same location between the shot putting attempts. Of course, as those skilled in the art will understand composite images may also be automatically generated showing selected different athletes in the same image so that their forms may be compared at the same event time—e.g., at the point of release of the shot.

The present embodiments relate to methods and apparatus for displaying image data corresponding to multiple images in an easily comprehendible form. In a first embodiment, imaging data is selected from a stream of images based on the timing of one or more events detected by a radar. The imaging data is combined according to various rules, to be discussed in detail below, to generate a composite image depicting image data from a series of time points related to the event.

FIG. 1 shows a system 100 for generating a composite image according to an illustrative embodiment. The system 100 includes a computing device 110 coupled to an event detection sensor 120 and a primary imager 130. In some of the embodiments described herein, the event detection sensor includes a radar 120, e.g. a continuous wave (CW) Doppler radar. The system 100 may also include any number of additional (secondary) imagers 140 coupled to the computing device 100. For example, the system 100 may comprise or be included in a tracking system for a sports venue, e.g. a baseball stadium, including a plurality of imagers disposed around the periphery of the stadium and directed toward the field of play and/or directed to the capture of specific players and/or events, such as pitches or hits. According to various embodiments to be described below, the computing device 110 may receive event detection data e.g., radar data, indicating the time at which each of a plurality of target events occurs, and, based on the detected event times, pull image data corresponding to the detected events.

Image data may be pulled not only for images including the events themselves, but for times before and after the events and/or for portions of the field separated from the location of the event, and the image data from these various times may be combined into a composite image according to various rules to be discussed in detail below. The system 100 may further include an output 150 to a display or another device for displaying the generated composite image. The output 150 may be e.g. a broadcast of a sports contest, for use in analyzing events occurring during the sports contest, wherein the composite image is generated in substantially real time after the event occurs. The output 150 may also be e.g. a computer display.

The event detection sensor 120 according to various exemplary embodiments includes a continuous wave Doppler radar emitting microwaves at, for example, an X-band frequency (8-12 GHz) at a power of up to 500 milliWatts EIRP (Equivalent Isotropic Radiated Power), thus being compliant with FCC and CE regulations for short range international radiators. However, in other jurisdictions, other power levels may be used in compliance with local regulations. In an exemplary embodiment, microwaves are emitted at a higher frequency between, for example, 10-125 GHz. For more precise measurements at lower object speeds frequencies of 20 GHz or higher may be used. Any type of continuous wave (CW) Doppler radar may be used, including phase or frequency modulated CW radar, multi frequency CW radar or a single frequency CW radar. It will be understood that other tracking devices such as lidar may be used with radiation in either the visible or non-visible frequency region.

However, those skilled in the art will understand that any type of radar or other sensor configured to detect the events of interest in a given application may be employed. Any other type of radar capable of tracking objects, either three-dimensionally or with reduced dimensionality, similar to those described herein may also be used. In another embodiment, a one-dimensional tracking device may be used such as a one-dimensional Doppler radar. In another embodiment, the system may use multiple tracking devices distributed about a target area into which the object is to be launched. In still other embodiments, the event detection sensor 120 comprises a microphone for detecting an event, such as a baseball hit, based on the audio signature generated by the event. In other embodiments, the event detection sensor 120 comprises a MEMS sensor e.g. an accelerometer or gyroscope, which may be located e.g. on a smart watch.

The computing device 110 receives data from the event detection sensor 120 (e.g. radar 120), the primary imager 130 and/or the secondary imager(s) 140 and time synchronizes the signals from the event detection sensor 120 to those being received from the primary imager 130 and the secondary imager(s) 140 so that, for any event detected by the radar 120, the computing device 110 can select images from the primary imager 130 and any or all of the secondary imagers 140 corresponding to the time of the event. The time synchronization across sensors may be performed according to a variety of methods known to the person skilled in the art. As would be understood by those skilled in the art, when the timing of an event (e.g. as detected by the radar 120) does not correspond precisely to the timing of the capture of an image from one of the imagers 130, 140 (e.g., the event time is between the times at which image frames were captured), the computing device 110 may select an image from the imager (130 or 140) that is closest in time to the time of the event.

However, depending on the desired information to be read from the resulting composite image, in various embodiments the computing device 110 may be configured to default to e.g. selecting the nearest image before the event timing or the nearest image after the event timing. For example, to show a batter's approach to a pitch in a baseball game, the nearest image prior to contact between the bat and ball (or, when the batter misses the ball, the nearest image to the ball crossing home plate) may be used instead of the nearest image after contact. In other embodiments, an image may be selected that is closest to a predefined duration of time away from the detection of the event, e.g. 0.1 seconds before a pitch crosses home plate.

The computing device 110 may also be pre-programmed to include a priori information about the images being received from one or more of the imagers 130, 140. In certain embodiments, the one or more of the imagers 130, 140 may be fixed in a particular location and have a relatively consistent field of view during the image capture. Certain locations in the received images may correspond to locations of interest in the sporting contest, e.g. the pitcher's mound or the batter's box in a baseball game. It may be desirable to define one or more areas of interest at which key elements will be located at, for example, the start of a play. To be discussed in further detail below, these regions or areas of interest may be processed in different ways during the generation of the composite image.

As would be understood, baseball plays generally originate with the pitcher pitching a ball from the pitching mound to home plate at which a batter waits to attempt to hit the pitched ball. Thus, a first area of interest may be defined within images from one or more of the imagers 130, 140 around the pitcher's mound, including an area within which the pitcher's body is expected to be found at the time of the release of the pitch. A second area of interest may be defined around home plate to include portions of the images from the selected imagers 130, 140 within which the body of the batter is expected to be found at the time when the ball crosses the plate (i.e., the time at which impact between the bat and the ball may occur).

As will be described in more detail below, a main image may be selected to form the basis of the composite image. In this example, an image of the baseball field from the primary imager 130 at the time that a fly ball is caught by a player is selected as the base image. The portion of the main image corresponding to the first area of interest showing the pitcher at the moment of release of the pitch (the release portion) is removed from an image captured by the primary imager 130 at the time identified as the time of the release of the pitch.

This release portion is inserted into the composite image at the position of this first area of interest in the main image, while the area corresponding to the first area of interest is removed from the main image, so that only the release portion is included in this portion of the composite image. The portion of the second area of interest (the impact portion) is then removed from the main image and replaced with a portion of an image from the primary imager 130 corresponding to the moment at which the batter impacts the pitched baseball. The second area of interest is removed from the composite image and replaced with this impact portion at the position within the composite image corresponding to the location of the second area of interest in the main image. The flight of the baseball is tracked by the radar 120, or by some ancillary tracking system, and the computing device 110 then inserts into the image a path indicating a trajectory of the ball as it travels from the pitcher to the batter, and then as the ball travels from the batter to centerfield. The trajectory may be inserted into the image as described, for example, in U.S. Pat. No. 9,855,481 to Tuxen et al. which is hereby incorporated by reference in its entirety. Those skilled in the art will understand that the base image may be formed from a plurality of images stitched together.

For example, if a first camera shows only a first portion of a field of play and a second camera shows a second portion of the field of play, a play that moves from the first portion of the field into the second may be shown in a single composite image where the base image is formed as a single image including all or portions of a frame from the first camera combined with all or a portion of an image from the second camera. A soccer play, for example, may originate in one team's defensive side (within the field of view of the first camera) and moves down the field to the offensive end (within the field of view of the second camera but not the first camera). For this play, the base image may include all or a portion of an image from the first camera showing the at least one area of interest frozen at the occurrence of a first event (e.g., the moment a player kicks the ball up the field. The base image may be combined with all or a portion of an image from the second camera including information in at least one area of interest relevant to the first event (e.g., the position of an offensive player and a deepest defensive player at the moment the ball was kicked to illustrate potential off-sides). The rest of the composite image (showing for example, a subsequent kick at the goal) may be generated in the same manner described above to illustrate a play that was not captured fully by either of the first and second cameras.

The basic mathematical form for the generation of composite images is shown in the following and will be described in further detail below. Given a set of images $\{I_1, \ldots, I_n\}$ taken by the same imager at different times: First, for each pixel position (x,y), i(x,y) denotes the image index in the set having a pixel value that differs most from the mean pixel value at position (x,y):

$$i(x, y) = \underset{i}{\mathrm{argmax}}\left\{\left|I_i(x, y) - \frac{1}{n}\sum_j I_j(x, y)\right|\right\}$$

The composite image C is then constructed from these pixel values:

$$C(x,y) = I_{i(x,y)}(x,y).$$

In a first variation, different sets of images may be considered for different parts of the composite image. This may be desirable when certain events are known to take place in different parts of the image.

In a second variation, to attain transparent elements in the composite image, the selected pixel values may instead be combined with a selected image $I_j$ with opacity value a:

$$C(x,y) = \alpha \cdot I_{i(x,y)}(x,y) + (1-\alpha) \cdot I_j(x,y)$$

In a third variation, the i(x, y) function may be augmented to take a pixel neighborhood (i.e. local region of pixels) into account when computing which image differs most from the mean. This can reduce the chance of undesired artifacts in the composite image, where single pixels happen to stick out.

Figure 2:
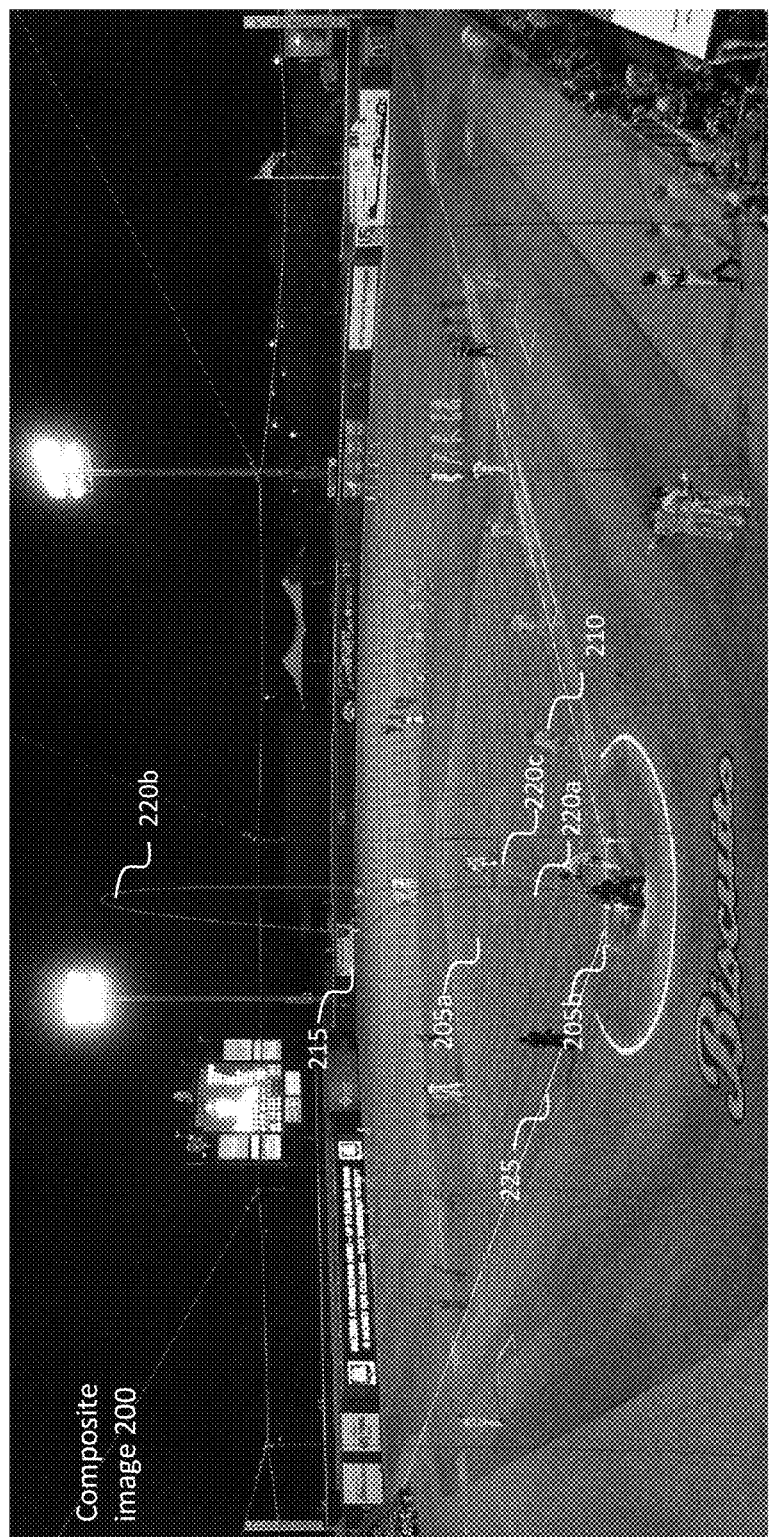
FIG. 2 shows an exemplary composite image depicting the progression of a baseball play.

FIG. 2 shows an exemplary composite image 200 depicting the progression of a baseball play. The baseball play includes three events of interest, specifically a pitched ball, a batted ball, and a catch of the ball by the center fielder. As described above, two special areas 205 or regions of interest are defined, i.e., a first area 205*a* including the pitcher's mound and a second area 205*b* including the batter's box. The composite image 200 includes image data for the first area 205*a* at the time of the release of the pitch and image data for the second area 205*b* at the time the ball is struck. The trajectory of the ball during the baseball game is shown in two portions, specifically for the pitch and for the batted ball, until the conclusion of the baseball play when the ball is caught.

As the main image for the composite image 200 is selected to be an image from the primary imager 130 at the time at which the ball is caught, the positions of the players in all of the areas outside the first and second areas of interest will be shown as they appear in the main image. This ensures that the player catching the ball is shown clearly in the composite image 200 at the moment the ball is caught, and that the positions of all of the players (fielders and runner(s)) and umpires outside the first and second areas of interest 205 are shown in the composite image 200 at the moment at which the ball is caught. Alternatively, another image may be selected as the main image (e.g., an image from the moment at which the ball is released by the pitcher). In this case, if desired, a third area of interest may be determined by tracking the ball as it carries through its trajectory.

The third area of interest may, for example, include an area sized to include a fielder who may be present to catch the ball. That is, based on a distance the ball has traveled from the batter, the system calculates the size of a human figure in the image at this distance from the imager and defines an area of interest around a point at which the ball's flight terminates. That is, when the ball's flight terminates, if it is caught, the body of the player catching the ball will likely be located within a circle, e.g., 5 meters in diameter centered at the point at which the ball's flight terminated. Thus, the computing device 110 defines this third area of interest and removes this portion of a later image from the primary imager 130 corresponding to the time at which the ball is caught and inserts this portion of the main image corresponding to this same area to show the fielder as he catches the ball.

The radar can detect events with a high degree of temporal precision, in part by detecting changes in the trajectory of the ball. The change in trajectory might also be a discontinuity in either velocity or acceleration, either magnitude or direction. In other words, a deviation from a ballistic flight of the ball, where only gravity, drag, lift and other smooth behaving aerodynamical forces act on the ball, is detected. For example, the relevant moments from this scenario, as detected by a radar, include the pitcher releasing the pitch at time t1, the batter striking the ball at time t2, and the centerfielder catching the ball at time t3. The primary imager 130 is located in this scenario behind home plate and has a field of view including the entire field and is constantly capturing imaging data (e.g., generating a video composed of a sequence of frames), the imaging data being correlated with a time of capture. When the radar outputs a timing of the events, the images correlating to times t1, t2 and t3 are retrieved by the computing device 110 (e.g., frames of the video sequence that most closely correspond to the times t1, t2 and t3).

The times t1, t2 and t3, in this example, may be used as benchmark moments in the generation of the composite image 200. For example, the composite image 200 may merely include the images from these three moments fused together, showing the progression of the players on the baseball field as the play develops. However, the time elapsing between t1 and t2 is relatively low, so not much motion on the field is to be expected, other than the pitcher finishing his follow-through and the batter swinging the bat. Therefore, only certain elements from each of these moments may be used in the composite image 200. However, image data may be pulled separately or included in the composite image 200 showing the players' positioning and readiness at the moment of release of the pitch and/or at the moment of impact of the ball with the bat.

For example, in the embodiment shown in FIG. 2, the image at t1 (moment of pitcher release, corresponding to the first special area 205a) is used in the composite image 200 to show the pitcher at the moment he is releasing the pitch. In this example, because the release positioning of the pitcher is considered important, the first area 205a is identified including the pitcher and a surrounding portion of the field (e.g., the mound area). The motion within the area is frozen at the moment of pitch release to more clearly illustrate this moment while activity in other areas will continue to be added to the composite image 200 to show action outside this first area of interest at later times. Those skilled in the art will understand that the definition of this first area 205a may be adjusted to generate a cleaner composite image, as areas in which little relevant motion is expected are frozen so that the ghost regions used in areas not marked as special to show motion (as will be described below) do not blur into one another.

These special areas 205 will vary depending, for example, on the sport being played, the situation within a game, a technical area to be emphasized in a particular image, etc. In the composite image 200, moving bodies in non-special areas of the image at t1, including fielders, umpires, etc. may be excluded from the composite image 200 or made semi-transparent (ghost regions) as will be described in further detail below. In this exemplary image 200, the area surrounding the batter has also been designated as a "special" area, e.g. area 205b. More specifically, the area within the circle surrounding home plate (including the batter, the catcher and the home plate umpire is shown only at t2 (the moment at which the ball contacts the bat or passes the front of home plate). There are no other "special" areas in this exemplary image 200.

In the non-special areas (i.e., the areas outside the "special" areas), motion is shown at regular time intervals (e.g., every second) by rendering any moving bodies as semi-transparent ghost regions, for example the region 210 showing the batter running toward first base. This includes, for example, the ball, fielders and field umpires, the batter as he runs the bases, etc. to deemphasize their persons so as to not overwhelm the composite image 200, while still showing the paths of movement during the time represented in the composite image 200. The ghost regions are generated by calculating an average of a value of each pixel in the non-special areas at the time represented by the ghost regions (e.g., one second after contact between bat and ball) with a value of the pixel at another selected time (e.g., t1 or t3).

Differences in pixel values from frame to frame may also be used to detect motion and to automatically determine the outlines of objects in motion. Specifically, when a pixel has changed from one frame to an immediately subsequent frame, because the background of the image is unchanged, it may be assumed that the change in pixel value represents movement. The system may then identify contiguous areas within which pixel values have changed (e.g., changed by at least a threshold level) to calculate the outline of a moving object within the image. This identification may then be used for subsequent image processing as will be discussed below. In some embodiments, the background may change between images, for example if a mounted camera has a change in orientation due to wind. However, an image alignment or image stabilization process may be used to keep the background consistent. In other embodiments, the camera may be unmounted, thus being subject to more significant changes in position or orientation, however similar stabilization processes may be used.

In this exemplary image, t3 represents the end of the time range of the composite image 200. The image at t3 (the moment at which the centerfielder catches the hit ball, as shown at location 215 in the composite image 200) is used in the composite image 200 to emphasize the final positioning of every player on the field at time t3, i.e., when the play is effectively over. In the composite image 200, all the moving bodies in the non-special areas of the image at t3 are shown in full opacity. To show the progression of the various players from time t2 (moment of bat/ball contact as shown within the special area 205b) to time t3 (moment ball is caught as shown at location 215), images may be retrieved at certain time points therebetween.

For example, an image can be retrieved exactly halfway between t2 and t3, or some other incremental spacing. In another embodiment, an image is retrieved every second, every half second, or some other predefined duration after the ball is hit. The embodiment shown in FIG. 2, for example, includes three images retrieved from one quarter, one half, and three quarters of the time between t2 and t3. For example, the ghost region 210 shows the batter running toward first base at the one quarter time between t2 and t3. Thus, with the exception of exclusions caused by the special areas 205, five depictions of each player on the field is shown, depicting their progressions from the time the ball is hit (t2) to the time the ball is caught (t3).

One example of the "special region" in effect is that the home plate umpire, who, for most of the play, was located within the area 205b in the composite image 200, is shown along the third base line at location 225 as the ball is caught. Only at time t3 (and at no time increment between t2 and t3) is the home plate umpire outside the special area 205b. Thus, the home plate region is protected from a confusing overlay of image features captured during the flight of the ball, which would detract from the depiction of the moment the ball is struck. The computing device 110 may be configured so that, even when a portion of a body is outside a special region 205 at a given time represented in the composite image, the entirety of the body (including the portions both within and outside the special region 205) is not shown in the composite image, to prevent distracting cut-offs of moving bodies from being shown in the composite image.

Additionally, the track 220 of the ball, as determined by the radar and or the imager(s), may be overlaid onto the composite image 200. The composite image 200 includes the track 220 of the ball from the pitcher until it reaches the bat, e.g. first track portion 220a, and the track 220 of the ball from the bat to the outfielder, e.g. second track portion 220b. The composite image 200 also includes a projection 220c of the path of the ball onto the field.

Figure 3:
FIG. 3 shows an exemplary composite image depicting a baseball play in which there are runners already on base during the play.

FIG. 3 shows an exemplary composite image 300 depicting a baseball play in which there are runners already on base during the play. The composite image 300 may be used for play analysis purposes, for example to determine whether the runners on base were "tagged up"—i.e., still touching, at the time the ball was caught, the bases at which they had begun the play—before attempting to advance to the next base. Because the exemplary composite images may be generated very quickly after the end of the play, e.g. substantially in real-time, the composite images may be used during an in-game replay review so that the umpiring crew may determine if the runners advanced legally. The composite images may also be used during a broadcast of the sports contest for use in a commentator analysis.

Figure 4:
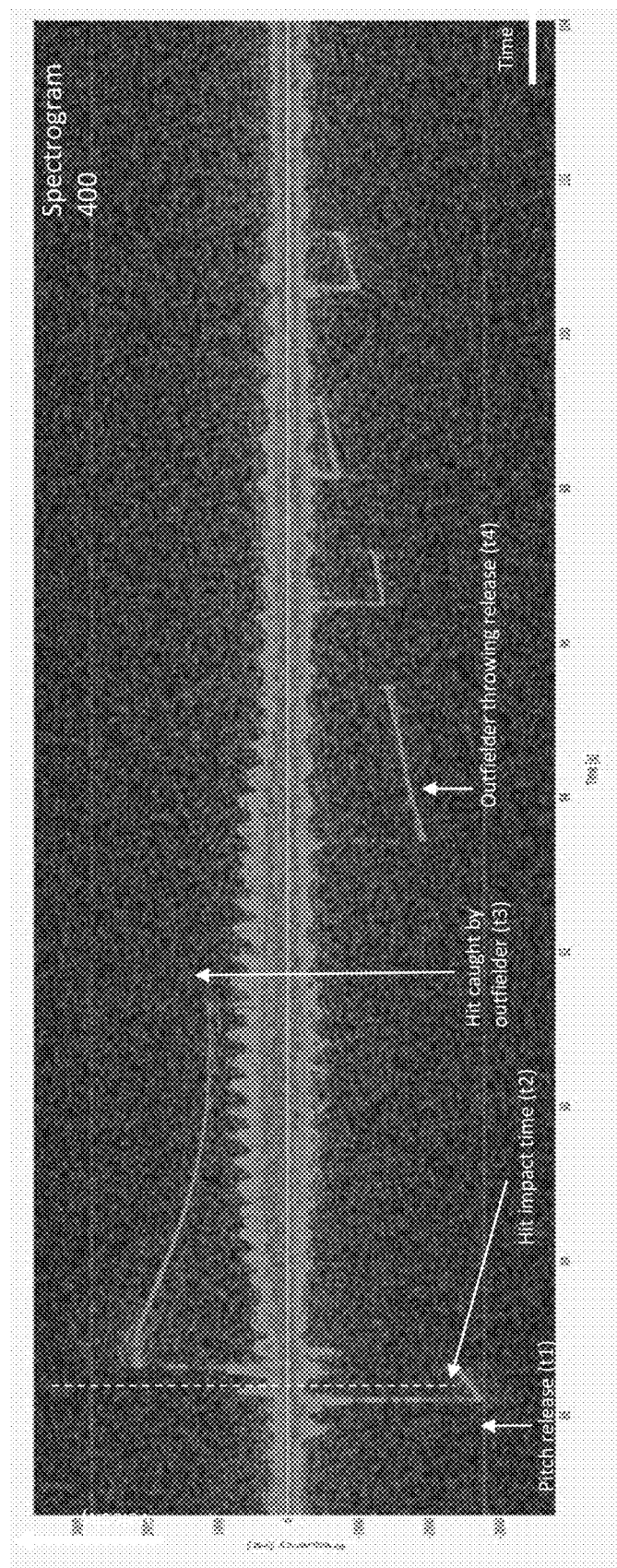
FIG. 4 shows an exemplary Doppler frequency spectrogram generated by a radar system observing (i.e. capturing radar data relating to) the situation depicted in the composite image of FIG. 2.

FIG. 4 shows an exemplary Doppler frequency spectrogram 400 generated by a radar system observing (i.e., capturing radar data relating to) the situation depicted in the composite image 200 of FIG. 2. Clearly visible in FIG. 4, and automatically detectable from the radar data using techniques known in the art, are discontinuities in the velocity identifying release of a pitch (t1), impact of the ball with the bat (t2) and the catch of the batted ball by the outfielder (t3). Also, the time when the outfielder releases the ball as he throws the ball back toward the infield (t4) is clearly visible and detectable. A velocity discontinuity may relate not only to the magnitude of the velocity, but also to the direction. For example, even in a scenario where the velocity of a projectile has a relatively minor change pre- and post-impact, e.g. a foul tip in baseball, the sudden directional change for the ball is detectable in the raw data from the radar.

As would be understood by those skilled in the art, trajectory and velocity data may be extracted from the spectrogram 400 in a manner known in the art and discontinuities may be identified using these techniques to determine when a moving ball or other item begins a ballistic trajectory and then, when this trajectory changes or stops indicating the ball or other item has been impacted or otherwise subjected to a force (e.g., in baseball when a ball is thrown, caught, hit, etc.). Even when the event itself (e.g., ball being caught) is not within the direct line of sight of the radar, for example when a body is positioned between the radar and the event, radars are generally capable of "seeing around corners," since the radar wave length can be selected to be in the same order of magnitude as the objects being measured. In this case the radar reflection occurs in the so-called resonant region and will be able to see around corners, just as radio waves are capable of being detected in closed rooms or vehicles. The magnitude of the reflection will be dependent on how clear the line-of-sight is to the object.

Figure 5:
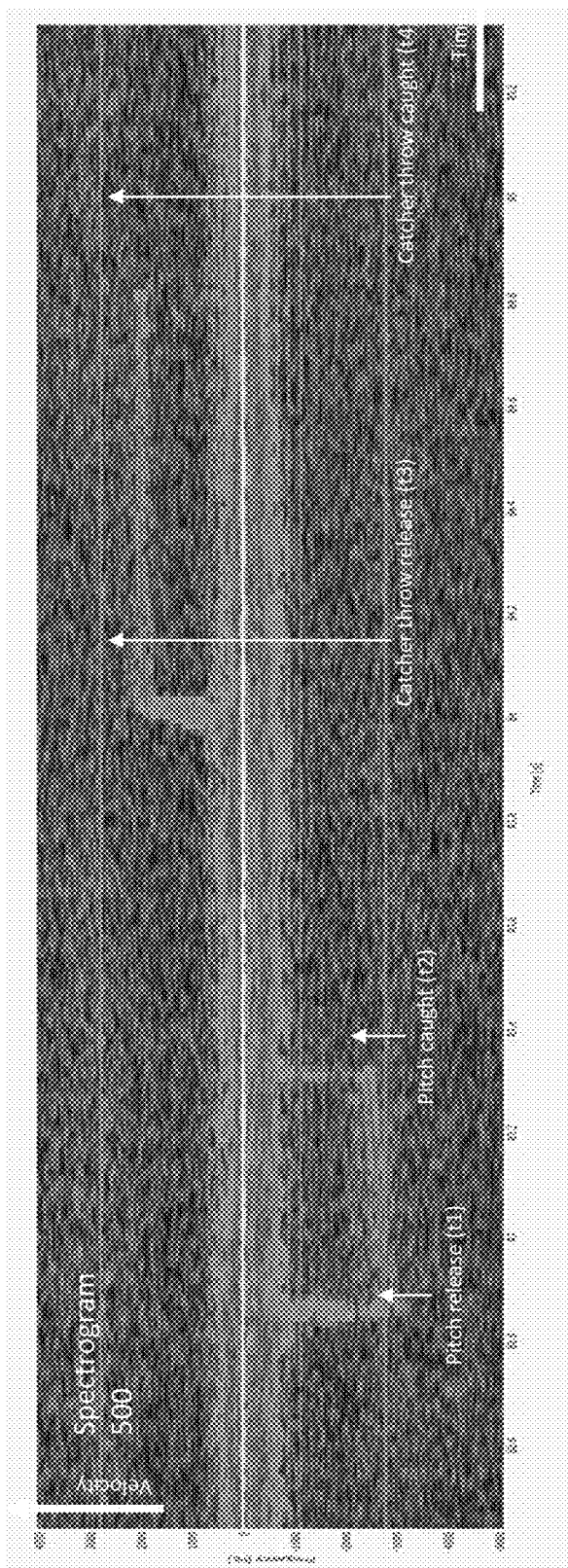
FIG. 5 shows an exemplary Doppler frequency spectrogram for another baseball situation in which the catcher rapidly throws the caught pitch to one of the fielders to prevent the stealing of a base.

FIG. 5 shows an exemplary Doppler frequency spectrogram 500 for another baseball situation in which the catcher rapidly throws the caught pitch to one of the fielders to prevent the stealing of a base. In FIG. 5, the time at which the pitch is caught by the catcher (t2) and the time at which the fielder catches the catcher's throw (t4), the so-called "pop-time," can be accurately determined. These events may then be used to generate a composite image showing where the baserunner was at pitch release (t1) and where the baserunner is when the catcher's throw is caught (t4), enabling visualization of whether the base stealing was successful or not (i.e., whether or not the runner should be called out). A composite image may also be generated including the time at which the catcher releases the ball (t3), which is also accurately detectable in the spectrogram 500.

The foregoing examples are used for exemplary purposes only, and many other rules, specific to different sports, different camera angles, or any other reason, may be implemented in a similar manner. For example, other parts of the field may have "special areas" that are frozen, i.e., these areas show only data from a single moment. For example, consider a baseball scenario where a composite image is generated depicting a first time point where an outfielder throws a previously hit ball from the outfield and a second time point at which a tag at third base is attempted. In this scenario, the "special areas" would include the area surrounding the outfielder and the area surrounding third base, while the pitcher's mound and batter's box area would not be so protected from overlaid images.

Other sports where similar features could be implemented include soccer, golf, American football, etc. However, sports where there are many more players on the field (such as American football) would require stricter rules for excluding certain portions of images, considering the high potential for confusing overlapping of players. In other embodiments, rather than having "special areas," certain actions taken by a player may cause the freezing of that moment in time in the composite image, i.e., the player at later time points is not shown. For example, a player may be tracked in the lead-up to a soccer kick, and then frozen at that moment of kicking, as will be described in further detail below with respect to FIG. 6. As would be understood by those skilled in the art, such events may be more efficiently processed for the production of composite images if some or all of the players are wearing or carrying a device (e.g., a smartwatch) that generates sensor data corresponding to movement or actions of the player that correspond with "events" as described herein and that specifically identify the player associated with the event.

Composite images may be pieced together in substantially real-time during the broadcast of a sporting event, for purposes of play analysis by the commentators or for any other reason. In another embodiment, historical data (where radar and imaging data is available and time-correlated) may be retrieved and pieced together in whatever way desired by the user.

In a second embodiment, rather than merely detecting changes in a trajectory of an object, the radar may positionally track the ball and detect events related to the ball crossing a threshold. For example, the radar may detect the precise moment a baseball crosses home plate, a foul line, the outfield wall (indicating a home run has been hit), etc. However, this type of event detection may be more applicable to other sports, such as soccer.

Figure 6:
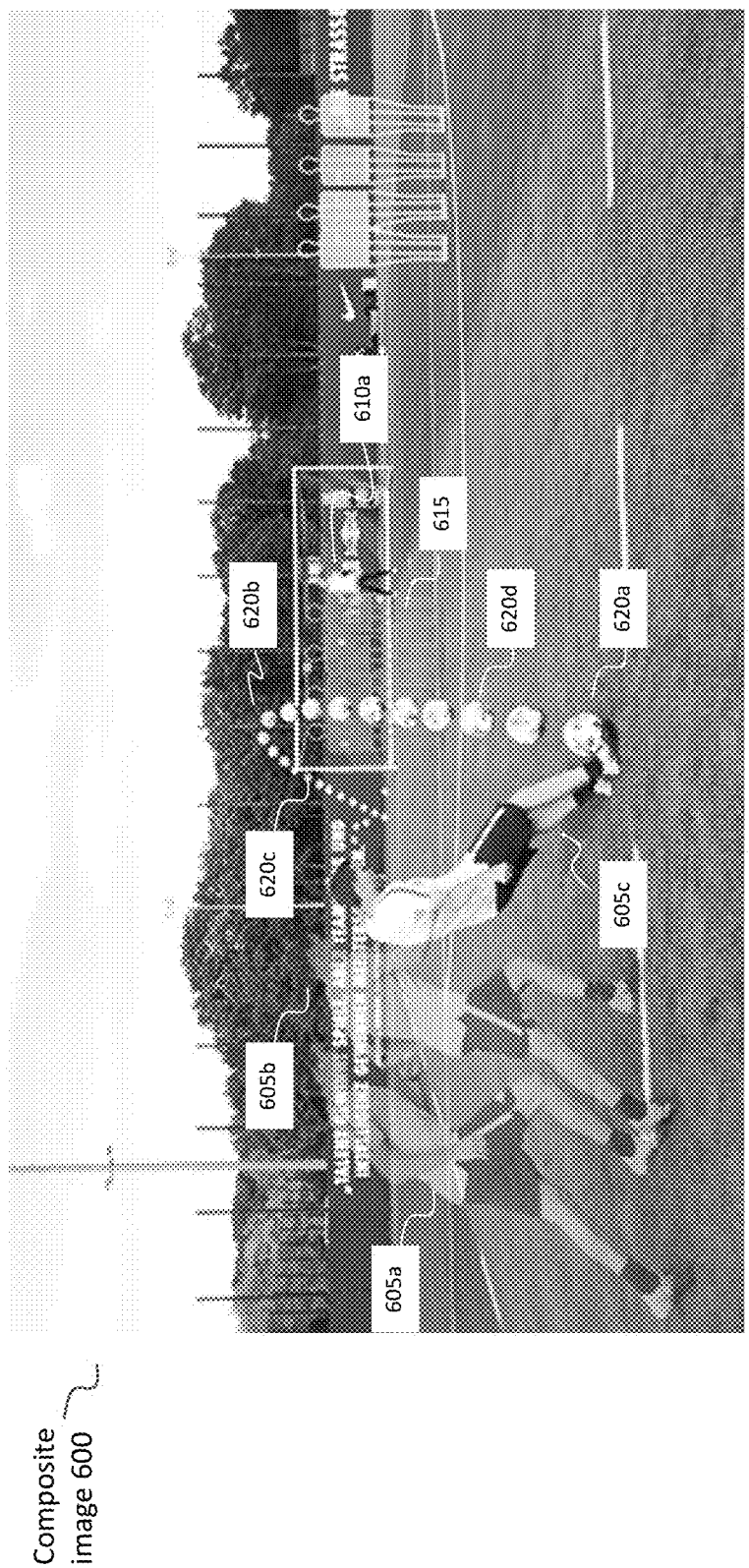
FIG. 6 shows an exemplary composite image depicting a scenario where a soccer player takes a direct free kick.

FIG. 6 shows an exemplary composite image 600 depicting a scenario where a soccer player takes a direct free kick. In this scenario, the relevant persons in the image are the kicker 605 and the goalkeeper 610. A projection 615 of a "wall," i.e., a line of defensive players blocking the path from the kick to the goal, is superimposed onto the image 600. However, in other scenarios, the wall could be a real wall.

In the embodiment of FIG. 6, the relevant "events" are the striking of the ball at time t1 (shown at 620a), the ball crossing the wall threshold at time t2 (shown at 620b), and the ball crossing the goal line at time t3 (shown at 620c). Here, once t1 is identified, images of the kicker 605 prior to the kick are superimposed (semi-transparently) to show the lead up to the kick (shown at 605a, 605b). The kicker at t1 is frozen, showing the precise moment of impact at 605c. The ball is then tracked over the course of its flight and shown at various time increments, e.g. at location 620d as the ball travels between its starting location and the wall 615, with the relevant threshold crossings (620b, 620c) color-coded to show the ball's position as it crosses these planes. For example, the ball may be colored yellow as it crosses the wall plane and orange as it crosses the goal plane.

In FIG. 6, the goalie 610 is frozen at his position at time t1, i.e., when the ball is struck (shown at 610a). However, the goalie's progression from his position at t1 to his position at t3 (goal line crossing) may also be shown. Similarly, if the wall 615 was a real life wall comprising one or more players, the motion of the players in the wall could be shown between t1 and t2. In one example, the wall at time t1 is semi-transparent, while the wall at time t2 (wall crossing) is opaque, effectively showing any jumping or horizontal motion of the players. A projection of a wall can be shown at different locations in the image, and the ball position when it crosses that location, wherever it may be, can be colored.

It is noted that in other embodiments the composite image may be generated using events detected through image tracking. For example, in the example shown in FIG. 6, the position of the ball may be determined through image tracking methods and the composite image generated without the use of the radar. However, in FIG. 6, the times t2 (ball crossing wall) and t3 (ball crossing goal line) may be difficult or impossible to accurately determine from current imagers employed in such situations since single imager data does not typically carry distance information for various reasons including, e.g., relatively low frame rates and exposure times as well as the small differences in the size of the ball between images. However, a radar tracking of the ball will be able to determine the 3D position ball and consequently know at what time the ball passes the wall.

An additional application related to soccer includes the determination of a time at which a ball becomes visible to a goalkeeper on a free kick, taking into account, e.g., the height and initial position of the goalkeeper, the height of the wall, and the path of the ball. This moment may be determined based on these aforementioned considerations using data from a radar, and, based on this time, an image of the ball at this moment may be indicated in the composite image by, e.g., color coding the ball at this moment.

Figure 7:
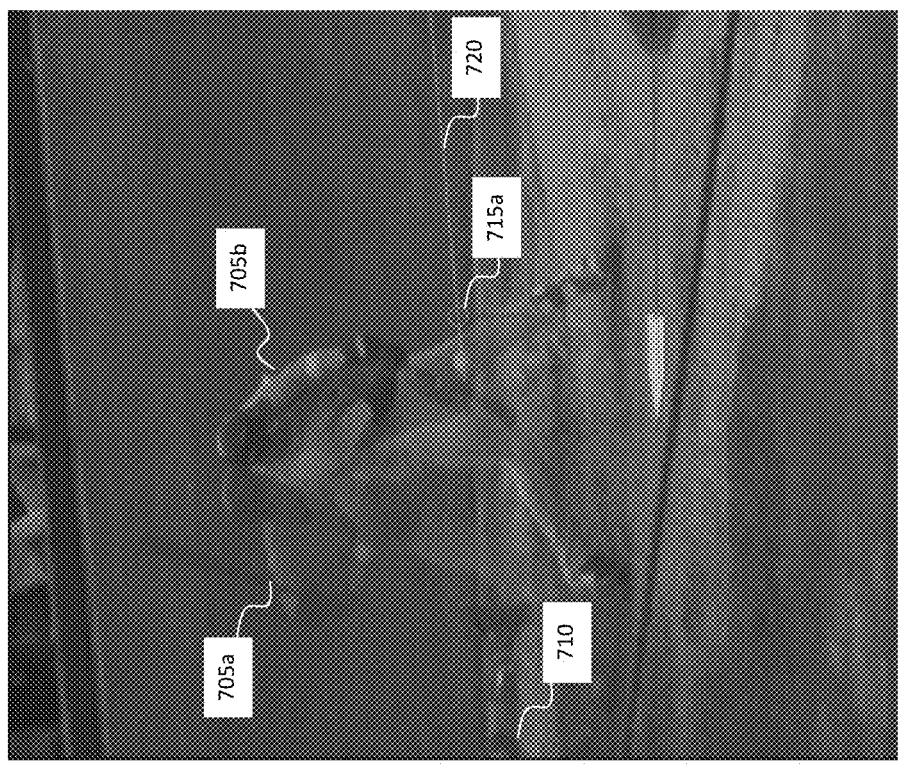
FIG. 7 shows an exemplary composite image depicting a scenario where a baseball player swings at a thrown pitch.

FIG. 7 shows an exemplary composite image 700 depicting a scenario in which a baseball player swings at a thrown pitch. In this scenario, the relevant people in the image include the batter 705 and the catcher 710. Two images are used in the generation of the composite image 700, i.e. an image including the batter 705 at some point t1 prior to the pitch delivery, e.g. at the time of pitch release (shown semi-transparently at 705a) and an image including the batter 705 at some point t2 at or close to impact between the bat and the ball or a moment at or close to when the bat misses the ball (if the batter swings and misses) (shown at 705b). Those skilled in the art will understand that any number of such images may be used to generate the composite image. The catcher 710 may be included at only a single time point, e.g. at the moment of impact t2, as the catcher's motion may be relatively minor between t1 and t2. Alternately, the catcher may be shown at the same time points as the batter.

In addition to the image data, a track 720 of the ball 715 may be displayed corresponding to the path of the pitch between t1 and t2. The track may also include additional durations before t1 or after t2, or only a portion of the track between t1 and t2. The moment at which the ball 715 crosses home plate may be determined and depicted in the image 700 (shown at 715a). Those skilled in the art will understand that the radar data may be used to generate this composite including frames of images depicting events that are not shown in the image (e.g., the composite image 700 shows the position of the batter 705 at the time of the release of the pitch even though the pitcher is not shown.

There are multiple advantages to having a radar or a combined radar and imaging tracking system determining event times. All changes in the trajectory or specific positions of the ball can be determined with such a system with subframe accuracy without having to do any image processing or image-based tracking. The tracking system simply identifies event times using the radar and identifies a type of event occurring at each event time identified. The system automatically selects, based on these event times, from the available images the images to be used in the generation of composite images. This significantly reduces the computational load on the system and enhances the robustness of the system which is vital for the timely automatic generation of composite images. Optionally, the tracking system may provide, in addition to event times and the identification of types of events, a position of the event that can be correlated to a specific region in the images from the imager.

In certain embodiments, the radar may be able to detect when a projectile has begun its ballistic trajectory even while the projectile remains in contact with a player. For example, in shotput, the "shot" (i.e. the heavy spherical ball) may begin its independent trajectory (independent of the trajectory of the shot putter's hand) at a time prior to release by the shot putter. The moment when the ball begins its independent trajectory is undetectable by an imager, as the ball remains in contact with the hand of the launcher—i.e., there is no separation between the hand and the shot that would be detectable in any image. However, radar data may accurately detect such a time based on velocity or acceleration discontinuities, as discussed previously.

FIG. 8 shows a velocity plot 800 for a shotput scenario in which a first portion 805 of the plot 800 corresponds to acceleration of the shot by the shot putter (i.e. the putter is providing a force to the ball) and a second portion 810 of the plot 800 corresponds to the trajectory of the shot independent from the putter (i.e. the ball's motion is substantially independent from the putter, even if the putter's hand remains in (light) contact with the ball) and is following a ballistic trajectory. Thus, a composite image may be generated for a shot putting scenario including the moment at which the ball assumes a trajectory substantially independent from the launcher. Other sports for where this type of analysis may be applicable include cricket and baseball, where the release of the object from e.g. the cricket bowler or the baseball pitcher may be slightly different than the time point at which the object assumes its substantially independent trajectory.

In a third embodiment, time-calibrated sensors may be used for real-time officiating purposes. For example, a radar may detect a moment a ball is kicked in soccer, pull a picture of the soccer pitch at that moment, and use the time-correlated picture to assess whether any player was offside. In another example, a radar may detect a moment a fly ball is caught in baseball, pull a picture of a runner on base attempting to tag up and reach the next base, and use the time-correlated picture to assess whether the runner had already left the base before player caught the fly ball. These features may be used for instant replay review purposes or real-time officiating. In still another example, a sensor such as a microphone may be time-calibrated to the other sensors and used to supplement the detections of the other sensors. For instance, in baseball, the moment a runner or fielder touches a bag may be obscured from the field of view of a camera and/or radar. A time-calibrated microphone or motion detector in the base may be used to capture the sound or movement of the contact with the bag and identify or estimate the moment of contact based on the captured sound or movement.

In a fourth embodiment, historical time-correlated data may be pulled to perform an analysis. For example, historical radar data for a pitcher may be manually tagged with the type of pitch thrown. A query of that pitch type could identify the radar data correlating to that pitch type, extract the moments of release, and pull all of the images taken at the same time point as those moments. These images can be used to compare pitching mechanics at the moment of release for pitches over time. A similar historical study can be performed for golf, soccer, etc.

Those skilled in the art will understand that the visual elements that are extracted in the generation of the composite images as described in regard to any of the prior embodiments may also be applied in the context of a video sequence, where images are played back chronologically exactly as they were captured. That is a video sequence may be produced as a series of composite images with portions of the filed frozen at event moments as described above while other portions of the field show the motion of players and objects over time. Any special areas may be frozen for an entire video sequence or may be updated (e.g., upon the occurrence of a later event). Those skilled in the art will understand that a frame rate of such a video of successive composite images may be altered as desired to show key information or in order to reduce processing time, etc.

An example of such a usage may be understood in terms of a soccer player taking a direct freekick as shown in FIG. 6, where a portion of the video sequence prior to the kicking player's run up to the ball, would include any composite image overlays. As the video is then playing (e.g., in slow motion), individual elements of the composite image, that is the player, the ball and the goal keeper, may then appear and be frozen in the video images at their positions at timings corresponding to detected events (e.g., depicted as ghost regions as described above) while action continues to unspool. As would be understood by those skilled in the art, the trigger causing each such composited image portion to be visualized in the video sequence in this embodiment is controlled by the event detection sensor 120 and the time-calibration between the sensor and the images (the video frames in this case) in the same manner described above and any such video sequence may contain any number of special areas frozen upon the detection of different events in the same manner described above.

Similarly to the embodiment described above, in a further embodiment, a video sequence may be generated in the same manner except that, instead of or in addition to the freezing of portions of each image of the sequence being frozen, irrelevant or less relevant elements of the images may be removed from the frames of the video sequence in the same manner described above. That is, portions of other images including the target portions of the field of view without the irrelevant or less relevant information (either from this same video sequence or from image frames taken at times outside the range of the action in the video sequence) may be substituted for portions of the field of view including irrelevant information (e.g., players not involved in a key play).

For example, portions of the field of view including baseball players not involved in a particular play may be replaced by corresponding portions of the field of view from frames with no players present in that portion of the image. For example, areas outside the regions of interest as described in [0032] may be replaced by corresponding portions of an image of the field without players present. That is, the portions of the images including those players may be replaced by corresponding portions of a base image as described in [0027]. Alternatively, these irrelevant or less relevant areas may be reduced in opacity to better highlight the players involved in the action. Again this utilization of the invention in relationship to a video sequence would mean that the event detection sensor 120 and the time-calibration between the sensor and the images (the video frames in this case) would be used to control, the timing at which various portions of the composite images are frozen in the video while other portions continue to show action.

It will be appreciated by those skilled in the art that changes may be made to the embodiments described above without departing from the inventive concept thereof. It should further be appreciated that structural features and methods associated with one of the embodiments can be incorporated into other embodiments in any manner not explicitly disavowed or logically inconsistent. It is understood, therefore, that this invention is not limited to the particular embodiment disclosed, but rather modifications are also covered within the scope of the present invention as defined by the appended claims.

What we claim is:

1. A system, comprising:
    a sensor capturing sensor data related to movement of one or more objects within a field of view of the sensor;
    an imager capturing, over time, image data within a field of view of the imager, wherein the field of view of the sensor overlaps with the field of view of the imager; and
    a computing device configured to:
        detect, based on the sensor data, a first event corresponding to movement of a first object;
        identify a first image in the image data having a first capture time correlating to a time of the first event; and
        generate a composite image including further image data captured at a time different from the first capture time combined with at least a portion of the first image corresponding to a first region of interest at which the first event occurs, wherein a portion of the composite image corresponding to the first region of interest excludes image data captured at times other than the first capture time.

2. The system of claim 1, wherein the computing device is configured to delimit the first region of interest in the composite image as an area in which the first event was expected to occur based on a priori knowledge of locations of interest within the field of view of the imager, or as an area in which the first event was detected to occur based on the sensor data.

3. The system of claim 2, wherein the sensor is a radar capturing radar data and the computing device is further configured to detect the first event based on detection of a discontinuity in the radar data exceeding a threshold degree of change.

4. The system of claim 1, wherein the sensor is a microphone and the computing device is further configured to detect the first event based on a change in data from the microphone exceeding a threshold degree of change or a threshold magnitude.

5. The system of claim 1, wherein the first image is identified by selecting from the imager data an image having a capture time closer to the time at which the first event occurred than any other image.

6. The system of claim 1, wherein the first image is identified by selecting from the imager data an image having a capture time that is either i) prior to the time at which the first event occurred and closer to the first capture time than any other image captured in the imager data prior to the time at which the first event occurred or ii) subsequent to the time at which the first event occurred and closer to the time at which the first event occurred than any other image captured in the imager data subsequent to the first capture time.

7. The system of claim 1, wherein the computing device is further configured to:
    detect a second event based on the sensor data;
    identify a second image in the image data having a capture time correlating to the time at which the second event occurred; and
    insert a portion of the second image into the composite image.

8. The system of claim 7, wherein the first event corresponds to a launch of an object on an object trajectory and the second event corresponds to an alteration of the object trajectory.

9. The system of claim 8, wherein the composite image includes the portion of the first image depicting the first event and the portion of the second image depicting the second event and a portion of a third image excluding areas at which the first and second events occurred.

10. The system of claim 9, wherein the composite image depicts a progression of motion of other objects in the image data between the time at which the first event occurred and the time at which the second event occurred.

11. The system of claim 9, wherein the computing device is further configured to exclude from a portion of the composite image including the portion of the second image, image data captured at any time other than the time at which the second event occurred.

12. The system of claim 11, wherein the computing device is further configured to incorporate into the composite image a portion of the third image corresponding to a time between the time at which the first event occurred and the time at which the second event occurred, wherein the portion of the third image is inserted into the composite image as a semi-transparent overlay in portions of the composite image excluding the first and second regions of interest.

13. The system of claim 12, wherein the computing device is further configured to insert into the composite image a depiction of a path of the object between the time at which the first event occurred and the time at which the second event occurred.

14. The system of claim 1, wherein the sensor is a radar configured and wherein the computing device is configured to generate object trajectories based on data from the radar.

15. A method, comprising:
capturing, using a sensor, data related to movement of one or more objects within a field of view of the sensor;
capturing, using an imager, over time, image data within a field of view of the imager, wherein the field of view of the sensor overlaps with the field of view of the imager; and
detecting, based on the sensor data, a first event corresponding to movement of a first object;
identifying a first image in the image data having a first capture time correlating to a time of the first event; and
generating a composite image by combining further image data captured at a time different from the first capture time with at least a portion of the first image corresponding to a first region of interest at which the first event occurs,
wherein a portion of the composite image corresponding to the first region of interest excludes image data captured at times other than the first capture time.

16. The method of claim 15, further comprising:
delimiting the first region of interest in the composite image as an area in which the first event was expected to occur based on a priori knowledge of locations of interest within the field of view of the imager, or as an area in which the first event was detected to occur based on the sensor data.

17. The method of claim 15, wherein the sensor is a radar capturing radar data, wherein the first event is detected by detecting a discontinuity in the radar data exceeding a threshold degree of change.

18. The method of claim 15, wherein the sensor is a microphone and wherein the first event is detected based on a change in data from the microphone exceeding a threshold degree of change or a threshold magnitude.

19. The method of claim 15, wherein the first image is identified by selecting from the imager data an image having a capture time closer to the time at which the first event occurred than any other image.

20. The method of claim 15, wherein the first image is identified by selecting from the imager data an image having a capture time that is either i) prior to the time at which the first event occurred and closer to the first capture time than any other image captured in the imager data prior to the time at which the first event occurred or ii) subsequent to the time at which the first event occurred and closer to the time at which the first event occurred than any other image captured in the imager data subsequent to the first capture time.

21. The method of claim 15, further comprising:
detecting a second event based on the sensor data;
identifying a second image in the image data having a capture time correlating to the time at which the second event occurred; and
inserting a portion of the second image into the composite image.

22. The method of claim 21, wherein the composite image includes the portion of the first image depicting the first event and the portion of the second image depicting the second event and a portion of a third image excluding areas at which the first and second events occurred.

23. The method of claim 22, further comprising:
excluding from a portion of the composite image including the portion of the second image, image data captured at any time other than the time at which the second event occurred.

24. The method of claim 23, further comprising:
incorporating into the composite image a portion of the third image corresponding to a time between the time at which the first event occurred and the time at which the second event occurred,
wherein the portion of the third image is inserted into the composite image as a semi-transparent overlay in portions of the composite image excluding the first and second regions of interest.

25. The method of claim 24, further comprising:
inserting into the composite image a depiction of a path of the object between the time at which the first event occurred and the time at which the second event occurred.

* * * * *